Patented July 14, 1925.

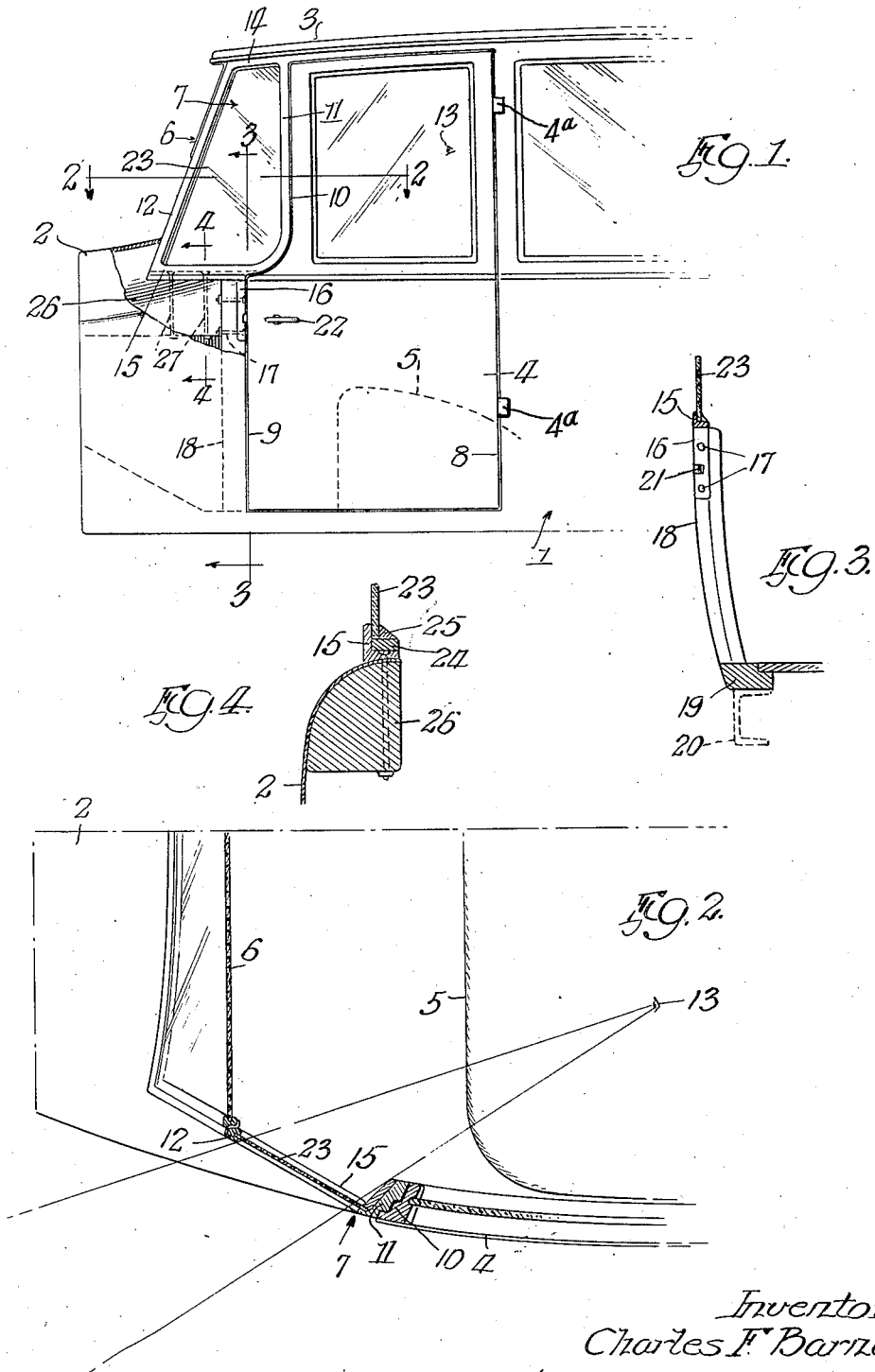

1,545,727

UNITED STATES PATENT OFFICE.

CHARLES F. BARNDT, OF RACINE, WISCONSIN.

AUTOMOBILE BODY.

Application filed December 2, 1921. Serial No. 519,304.

*To all whom it may concern:*

Be it known that I, CHARLES F. BARNDT, a citizen of the United States, residing at Racine, in the county of Racine and State of Wisconsin, have invented new and useful Improvements in Automobile Bodies, of which the following is a specification.

This invention relates to automobile bodies and more particularly to bodies of the closed type.

One object of my invention is to provide a body construction wherein the windshield posts at the sides of the body are moved back closer to the eye of the driver than heretofore and thus remove said posts out of the driver's line of vision to the sides of the car and prevent said posts from hiding objects approaching or approached at the sides of the car and avoid accidents by allowing the driver to have a clear view to the left as well as to the right.

Another object of my invention is to offset the upper portion of the front edge of the forward door to the rear of the lower portion of such edge so that the windshield posts when used as a stop member for said door may be brought closer to the driver's eye for the purposes stated.

A further object of my invention is to retain sufficient leg room between the driver's seat and the lower portion of the front edge of said door to allow getting in and out of the car, while still offsetting the upper portion of said edge for the purposes mentioned.

Other and further objects of my invention will appear from the following specification taken in connection with the accompanying drawings, in which—

Fig. 1 is a side elevational view, partly in section, of the forward part of a closed automobile body constructed in accordance with my invention;

Fig. 2 is a horizontal sectional view taken on line 2—2 of Fig. 1; and

Figs. 3 and 4 are vertical sectional views taken on lines 3—3 and 4—4, respectively, of Fig. 1.

In the drawings, 1 indicates one of the side walls of a closed automobile body; 2, the cowl at the front of the body; 3, the top or roof thereof; 4, the forward door; 5, the front or driver's seat; 6, the front windshield section extending across the body forward of said seat; and 7, the side windshield section at the driver's side of the car. It is to be of course understood that there is a similar side windshield section, such as 7, at the opposite side of the car, and inasmuch as both are the same only one is shown herein. In the type of body design illustrated, the main or front windshield section 6 slopes upward toward the top 3.

The door 4 is hinged along its rear edge 8 to the body 1, by hinges $4^a$ usually employed in body construction. The lower portion 9 of the forward swinging edge of the door is forward of the seat 5 a distance sufficient to allow getting in and out of the body when the door is open. The upper portion 10 of said forward edge is offset rearward from the lower portion 9, as clearly shown in Fig. 1.

The side windshield section 7 has a rear post 11. This is secured to the body below or adjacent its belt line and extends upward along the offset upper edge 10 of the door 4 and forms a stop therefor, as shown in Fig. 2. By this construction, the rear post 11 is spaced rearward from the front post 12 of said section 7 a distance sufficient to provide a relatively wide clear vision space between the rear post 11 and the forward windshield section 6. Thus the rear post 11 is located closer to the eye of the driver (indicated for illustration at 13 in the drawings) than in body designs as heretofore made. Thus the field of vision of the driver forward through the side section 7 is materially increased over body designs as heretofore made, and permits such a relatively wide clear vision at the side of the car that the driver may see everything approaching or being approached from the driver's side of the car and thus avoid the possibility of accidents through collisions by having the rear post 11 in line of vision to hide such objects as heretofore.

In manufacturing closed bodies, two elements need be considered, first, foot room between the front of the driver's seat 5 and the forward edge 9 of the door 4, and the height of the eye 13 from the top of the seat 5, which is necessarily limited on account of the ordinary leg room inside of the body. By my invention, however, a wide clear vision is gained by offsetting the upper edge 10 of the door 4 rearward from the lower edge 9 thereof, or, in other words, bringing the upper edge of the door 4 closer to the eye of the driver and thus remove the rear post 11 to the rear of the normal line of vision of the driver to the side of the car through the side windshield section 7. This construction still permits retaining the required distance between the seat 5 and the lower front edge 9 of the door to allow getting in and out of the body to the same extent as heretofore employed in body designs.

The posts 11 and 12 of the side section 7 constitute part of a metal frame, cast or otherwise made. This frame has the posts 11 and 12 connected at the top by a cross member 14 beneath the top 3 and secured thereto. Said posts 11 and 12 are connected at their lower ends by a cross member 15. To attach said frame to the body, I provide a depending lug 16 made part of the frame and offset forward from the rear post 11, as shown in Fig. 1. Said lug 16 is secured by bolts 17 to an upright member 18 of the body frame. Said member 18 is secured at its lower end to a sill 19 (Fig. 3), which in turn is attached to the adjacent side member 20 of the vehicle chassis. The lug 16 is in the door opening and is provided with a keeper socket 21 to receive the bolt of the latch mechanism of the door, the handle of said mechanism being indicated by 22 in the drawings. Set in said frame to close the same is a plate of glass 23. As shown in Fig. 4, the marginal members of the frame are L-shape in cross-section to receive the edges of the glass plate 23 and wooden filler and fastening strips 24 and 25, respectively. The bolts 27 extend through the lower flange of the lower cross member 15 and into and through an underlying beam member 26 of the body frame.

The lower portion of the rear post 11 is extended forward to the lug 16 and may be rounded or curved, as indicated in the drawings, to conform to the curvature of the door at the junction between the upper and lower edges 9 and 10, respectively.

The frame mentioned is preferably cast in one piece and made of relatively light metal, such as brass, thus permitting the rear post 11 to be made relatively thin and thus increase the width of the clear vision space provided between the front and rear posts of the side windshield section 7.

While I have shown and described herein in detail a body design embodying the features of my invention, it is of course to be understood that the details of construction and arrangement of parts illustrated may be variously changed and modified without departing from the spirit and scope of my invention.

I claim as my invention:

1. In a closed automobile body, the combination with a driver's seat, of a windshield extending across said body forward of said seat, a door in the side wall of said body at said seat and hinged to the body along its rear edge, the lower portion of the forward swinging edge of said door being forward of said seat, and the upper portion of said edge being offset rearwardly from the lower portion thereof to provide a relatively wide clear vision space to the side of said body between said door and windshield, a stop post for the upper offset edge of said door, said post being secured to said body and made relatively narrow to increase the width of said clear vision space, and a glass plate in said space for closing the same.

2. In a closed automobile body, the combination with a driver's seat, of a windshield extending across said body forward of said seat, a door in the side wall of said body at said seat, the lower portion of the front edge of said door being forward of said seat and the upper portion of said edge being offset rearwardly from the lower portion thereof to provide a relatively wide clear vision space to the side of the body between said door and windshield.

3. In a closed automobile body, the combination with a driver's seat, of a windshield extending across said body forward of said seat, a door in the side wall of said body at said seat and hinged to the body along its rear edge, the lower portion of the forward swinging edge of said door being forward of said seat and the upper portion of said edge being offset rearwardly from the lower portion thereof to provide a relatively wide clear vision space to the side of the body between said door and windshield.

4. In a closed automobile body, the combination with a driver's seat, of a windshield extending across said body forward of said seat, a door in the side wall of said body at said seat and hinged to said body along its rear edge, the lower portion of the forward swinging edge of said door being forward of said seat and the upper portion of said edge being offset rearwardly from the lower portion thereof to provide a relatively wide clear vision space to the side of the body between said door and windshield, and a glass plate set in said space for closing the same.

5. In a closed automobile body, the combination with a driver's seat, of a windshield extending across said body forward of said seat, a door in the side wall of the body at said seat and hinged along its rear edge to said body, the lower portion of the forward swinging edge of said door being forward of said seat and the upper portion of said edge being offset rearwardly from the lower portion thereof to provide a relatively wide clear vision space to the side of said body between said door and windshield, an open frame in said space and secured to said body, said frame having front and rear posts, the former being at said windshield and the latter in line with the upper offset edge of said door and forming a stop therefor, and a glass plate in said frame for closing the same.

6. In a closed automobile body, the combination with a driver's seat, of a windshield extending across said body forward of said seat, a door in the side wall of the body at said seat and hinged along its rear edge to said body, the lower portion of the forward swinging edge of said door being forward of said seat and the upper portion of said edge being offset rearwardly from the lower portion thereof to provide a relatively wide clear vision space to the side of said body between said door and windshield, an open frame in said space, said frame having front and rear posts, the former being at said windshield and the latter in line with the upper offset edge of said door and forming a stop therefor, said frame having a depending member offset forward from said rear post for attachment to said body, and a glass plate in said frame for closing the same.

In testimony that I claim the foregoing as my invention, I affix my signature, this 30th day of November, A. D. 1921.

CHARLES F. BARNDT.